(12) United States Patent
Hanks

(10) Patent No.: US 7,156,241 B2
(45) Date of Patent: Jan. 2, 2007

(54) COMPOSITE FLUID SEPARATOR

(76) Inventor: Gary David Hanks, 1249 Oliver, Bowling Green, KY (US) 42104

( * ) Notice: Subject to any disclaimer, the term of this patent is extended or adjusted under 35 U.S.C. 154(b) by 9 days.

(21) Appl. No.: 10/505,034

(22) PCT Filed: Feb. 14, 2003

(86) PCT No.: PCT/US03/04523

§ 371 (c)(1),
(2), (4) Date: Aug. 13, 2004

(87) PCT Pub. No.: WO03/068361

PCT Pub. Date: Aug. 21, 2003

(65) Prior Publication Data

US 2005/0161397 A1    Jul. 28, 2005

Related U.S. Application Data

(63) Continuation of application No. 10/076,161, filed on Feb. 14, 2002, now Pat. No. 6,763,952.

(51) Int. Cl.
*B01D 17/028* (2006.01)
(52) U.S. Cl. .............. 210/519; 210/521; 210/540; 210/DIG. 5
(58) Field of Classification Search .......... 210/519, 210/521, 522, 532.1, 538, 540, DIG. 5
See application file for complete search history.

(56) References Cited

U.S. PATENT DOCUMENTS

| | | | |
|---|---|---|---|
| 1,458,805 A * | 6/1923 | Christensen ............... 210/521 |
| 2,846,073 A * | 8/1958 | Hopper, Sr. ................ 210/540 |
| 3,797,203 A * | 3/1974 | Murdock, Sr. ............. 210/521 |
| 4,064,054 A | 12/1977 | Anderson et al. |
| 4,203,849 A | 5/1980 | Ino et al. |
| 4,376,676 A * | 3/1983 | Gill ............................ 196/46 |
| 4,400,274 A | 8/1983 | Protos |
| 4,568,901 A | 2/1986 | Adam |
| 4,747,948 A | 5/1988 | North |
| 5,161,512 A | 11/1992 | Adam et al. |
| 5,173,195 A | 12/1992 | Wright et al. |
| 5,252,229 A * | 10/1993 | Rojey et al. ........... 210/DIG. 5 |
| 5,520,825 A | 5/1996 | Rice |
| 5,554,301 A | 9/1996 | Rippetoe et al. |
| 5,628,901 A * | 5/1997 | Lawrence et al. ..... 210/DIG. 5 |
| 5,685,974 A | 11/1997 | Fleming |
| 5,698,102 A | 12/1997 | Khudenko |
| 5,840,198 A * | 11/1998 | Clarke ....................... 210/540 |
| 6,042,722 A * | 3/2000 | Lenz .......................... 210/519 |
| 6,056,128 A | 5/2000 | Glasgow |
| 6,217,777 B1 | 4/2001 | Dahlquist et al. |
| 6,315,131 B1 * | 11/2001 | Terrien et al. ............. 210/519 |
| 6,495,035 B1 * | 12/2002 | Lingelem ................... 210/519 |

* cited by examiner

*Primary Examiner*—Christopher Upton
(74) *Attorney, Agent, or Firm*—Kerrick Stivers Coyle & Van Zant; Laura M Hagan

(57) ABSTRACT

A composite fluid separator for isolting a first liquid from a second liquid having a different specific gravity. A housing (52) encloses a separation chamber (53). An inlet port (60) delivers the composite fluid into the sump (65) of the chamber. A plurality of stacked baffles (30) is positioned between the inlet and outlet ports, composed of individual inclined separation flow plates (25). The baffles create a flow path in which the fluid flows over each of the plates as it travels upward in the separation chamber toward the outlet port (50).

5 Claims, 6 Drawing Sheets

COMPOSITE FLUID SEPARATOR

BACKGROUND OF THE INVENTION

The present invention relates to a device used to separate composite fluids comprised of at least two liquids of differing specific gravities and to separate particulates from fluids.

SUMMARY OF THE INVENTION

The composite fluid separator is capable of isolating a first liquid from a composite fluid having a first and second liquid, in which the first and second liquid has differing specific gravities. The composite fluid separator can be used primarily in conjunction with large gasoline, diesel and hydraulic engines. Additionally, the present invention can be used for the separation of particulate from fluids in any setting.

An inlet port, which enters into an inner chamber of the separation device, delivers the composite fluid through an elongated spillway, which delivers the fluid into the sump area of the chamber. The composite fluid separator is comprised of an inlet port and an outlet port, with a flow path therebetween. The flow path extends around a plurality of baffles. The plurality of baffles form planes which are stacked in an inclined, nonparallel relationship. The plurality of baffles are arranged so that a first side of alternating baffles are flush with the first side wall of the chamber, while the second opposing side of the baffles is placed a predefined distance from the second side wall of the inner chamber. The remaining alternating baffles in the stacked plurality are placed so that the second sides of the baffles are flush with the second side wall of the chamber and the first sides of the baffles are a predefined distance from the first side wall of the chamber. Such alternating positioning of the baffles within the chamber forms a serpentine flow path over the baffles and through the separation chamber.

The inclined, nonparallel position of the baffles creates numerous narrow flow channels between the baffles. The arrangement of the plurality of baffles forces the composite fluid to be directed in a serpentine fashion across each baffle as it moves through the numerous openings between the side walls of the chamber and the plurality of baffles toward the outlet port. As the composite fluid follows this flow path, it rises upwardly within the separation chamber. The serpentine pathway and the numerous baffles limit the upward mobility of the heavier liquid. The molecules of the heavier liquid come into contact with each other, coagulating into a larger mass, eventually dropping toward the bottom end of the inclined baffles along with the particulate into the sump area of the chamber.

The lower ends of the baffles extend toward, but not to, the front wall of the chamber. The spacing between the lower ends of the baffles and the front wall of the chamber is approximately one-half the size of the openings between the sides of the baffles and the chamber side walls.

Each of the baffles within the separation chamber is actually comprised of a series of subplates placed one on top of the other, which form a triangular stair step like structure. These subplates serve a directional purpose in that they direct the fluid upward towards the next baffle and also provide an irregular surface area which enlarges the contact surface area between the composite fluid and the baffles. The shearing of the composite fluid by the subplates assists with the removal of particulates and separation of fluids having differing specific gravities.

As the composite fluid travels through the separation chamber, it is sheared so that it efficiently and effectively isolates the liquids that form the composite fluid. After traveling through the flow path, the liquid with the lighter specific gravity reaches the outlet port of the chamber. The outlet port may also allow for use of other types of coalescing devices or filtering devices to be placed within the outlet port to further enhance the separation capabilities of the chamber.

Thus, one object of the present invention is to provide a separation chamber for composite fluids.

An additional object of the present invention is to provide a composite fluid separator which isolates a first fluid from a second fluid.

An even further object of the present invention is to provide a separation chamber for a composite fluid separator wherein the separation chamber has a plurality of baffles contained therein, the composite fluid passing over the plurality of baffles within the separation chamber.

Another object of the present invention is to have a separation chamber formed of a plurality of baffles wherein the baffles form a serpentine flow path for the composite fluid. The flow path may be increased by providing that each of the baffles is actually comprised of a plurality of baffles stacked upon each other in stair step fashion in order to force the composite fluid in an upward direction.

An additional object of the present invention is to provide a separation chamber wherein the flow path of the composite fluid is such that the fluid is quickly separated into distinct fluids based upon the specific gravity of the fluids, the baffles enabling the heavier fluids to be separated out and deposited into a sump area of the separation chamber.

Finally, another object of the present invention is to provide a composite fluid separation device wherein particulate material within the composite fluid may also be separated from the fluid.

All of the above-outlined objectives are to be understood as exemplary only and many more objectives of the invention may be gleaned from the disclosure herein. Therefore, no limiting interpretation of the objectives noted is to be understood without further reading of the entire specification, claims and drawings included herewith.

DETAILED DESCRIPTION OF THE EMBODIMENT

Figure 1:
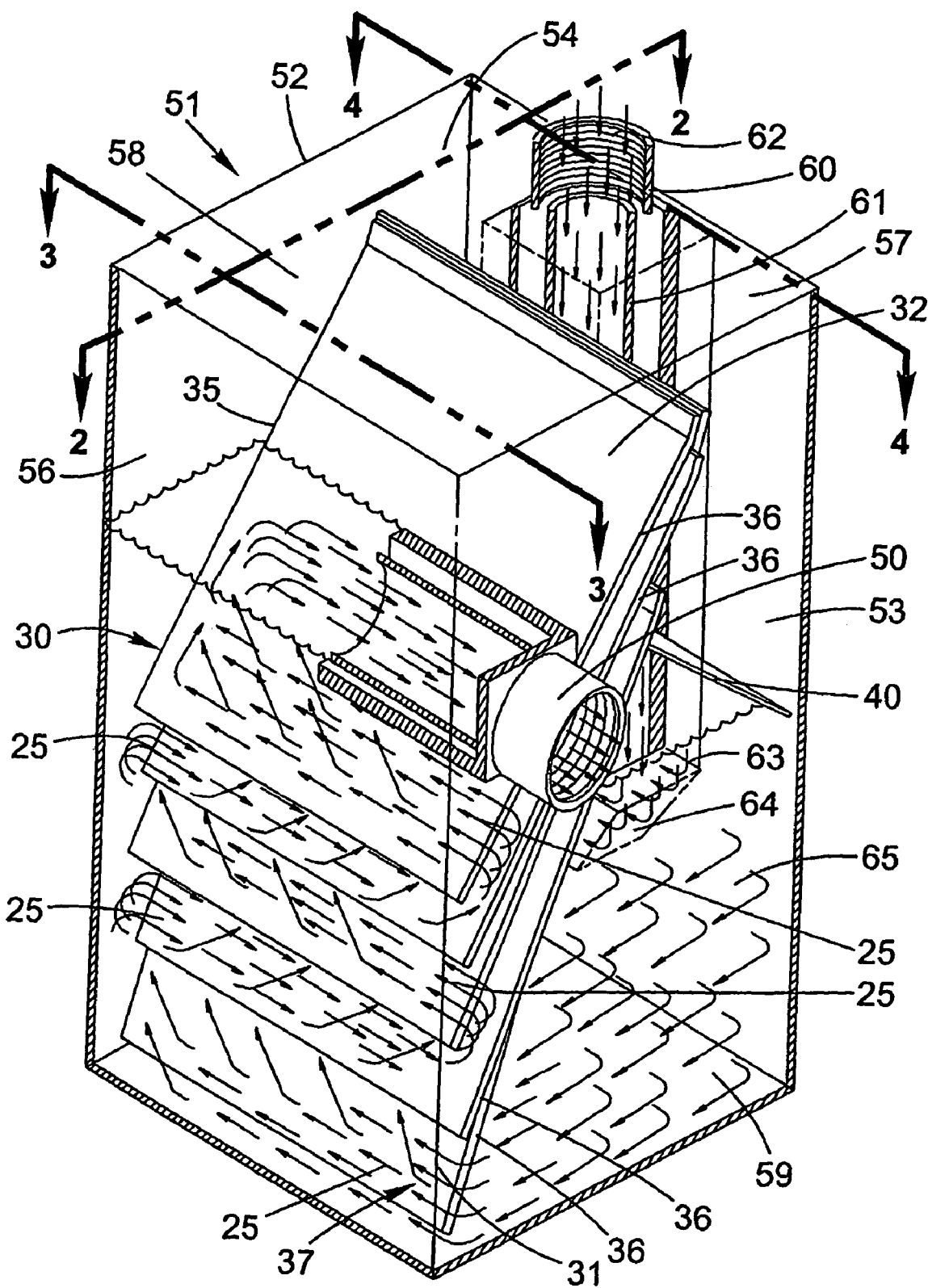
FIG. 1 is a perspective partial cut-away view of an embodiment of the present invention, illustrating the flow path of the composite fluid.

FIG. 1 is a cut-away perspective view of the composite fluid separator 51 used to separate a composite fluid having two fluids with differing specific gravities and also used to remove particulate from fluids. An outer housing 52 encloses an inner separation chamber 53. Although the shape of the diameter of the separation chamber 53 may vary, one embodiment is square. However, many varying geometry may be utilized in order to accomplish the separation of composite fluid using the principals of the present invention and no limiting interpretation should be read into the exemplary specific devices described herein.

The separation chamber 53 has a top and bottom surface 54, 55, a front and rear wall 56, 57, and a first and second side wall 58, 59. The periphery of the separation chamber 53 is surrounded by walls. An inlet port 60 penetrates the top surface 54 of the chamber 53 and extends to form an elongated spillway 61 that is attached to the rear wall of the chamber 53. The inlet port 60 has a first and second end 62, 63. The first end 62 of the inlet port 60 is near the top surface 54 of the inner chamber 53 and is open. The inlet port 60 and the spillway 61 can be integrated into a singular spillway component or the inlet port 60 and the spillway 61 can be separate elements which possibly telescope together.

The second end 63 of the spillway 61 extends down toward the bottom wall or surface 55 of the separation chamber 53 along rear wall 57. The lower or second end 63 of the spillway 61 is open, but does have an end baffle 64 attached at an angle in order to dispense the material at an angular path.

As the composite fluid flows out of the lower end 63 of the spillway 61 into the sump portion 65 of the chamber 53, the end baffle 64 serves to provide a shearing mechanism for the composite fluid as it is deposited through the spillway into the chamber. This initial shearing by the end baffle 64 allows the heaviest droplets of liquid to fall out of the composite fluid and remain in the sump portion 65 of the chamber 53.

The end baffle 64 of the spillway 61 serves to direct the composite fluid to a portion of the sump 65 of the chamber 53 furthest away from the flow path created by the plurality of baffles 30. This forces the composite fluid to travel across the sump 65 of the chamber 53 to the plurality of baffles 30. This travel of the fluid allows the larger droplets of the heavier liquid of the composite fluid to fall out of the fluid and remain in the sump 65 of the chamber 53.

Figure 2:
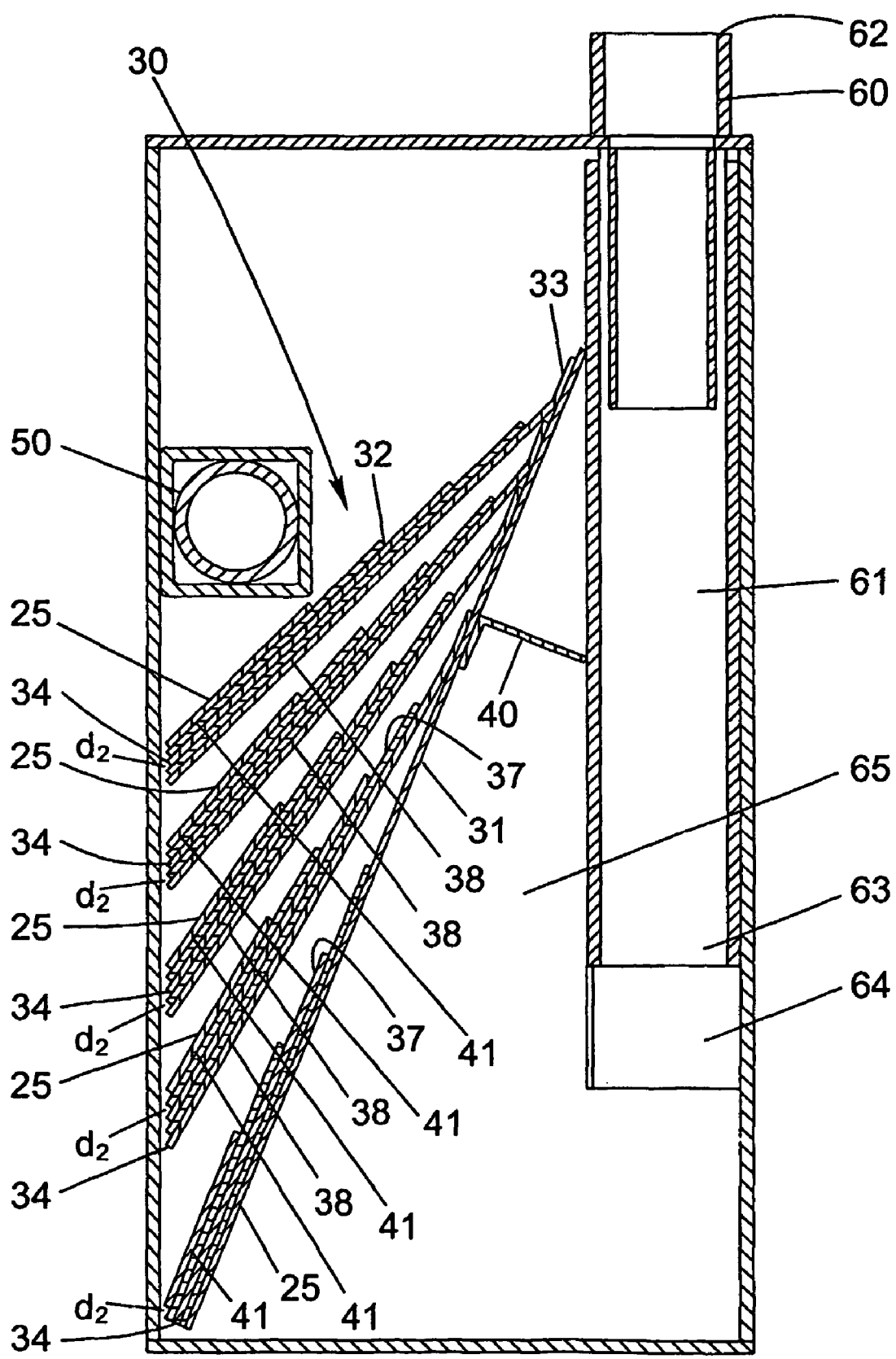
FIG. 2 is a sectional side view of an embodiment of the present invention taken along the lines 2—2 in FIG. 1, depicting the interior of the present invention in a plane.

Layered within the separation chamber 53 is a plurality of baffles or plates 30 stacked in an inclined, nonparallel relationship. As is shown in FIG. 2, this plurality of baffles 30 has a base or rear-most baffle or plate 31 which is connected to the spillway 61 at an upper end 33 thereof thereby forming the sump area 65 within the chamber 53. The upper ends of each of the remaining plurality of baffles 30 are attached to the base baffle 31 at an inclined angle. These remaining plurality of baffles 30 are positioned at an inclined relationship to the base baffle 31 at an angle increasing in relation to the vertical axis of the chamber 53.

All of the plurality of baffles 30 extend across the chamber 53 from the upper end at a downward angle directed toward the front wall 56 of the chamber 53. Each of the plurality of baffles 30 is sized so that it covers most of the entire width of the inner chamber 53 from side wall 59 to side wall 58. The lower ends 34 of the plurality of baffles 30 do not come into contact with the front wall 56 of the chamber 53, but rather end at a predetermined distance $d_1$ from the front wall 56 of the chamber 53. The predetermined distance $d_1$ may vary depending upon the circumstances and the environment in which the filter is being used and the material being separated.

Figure 3:
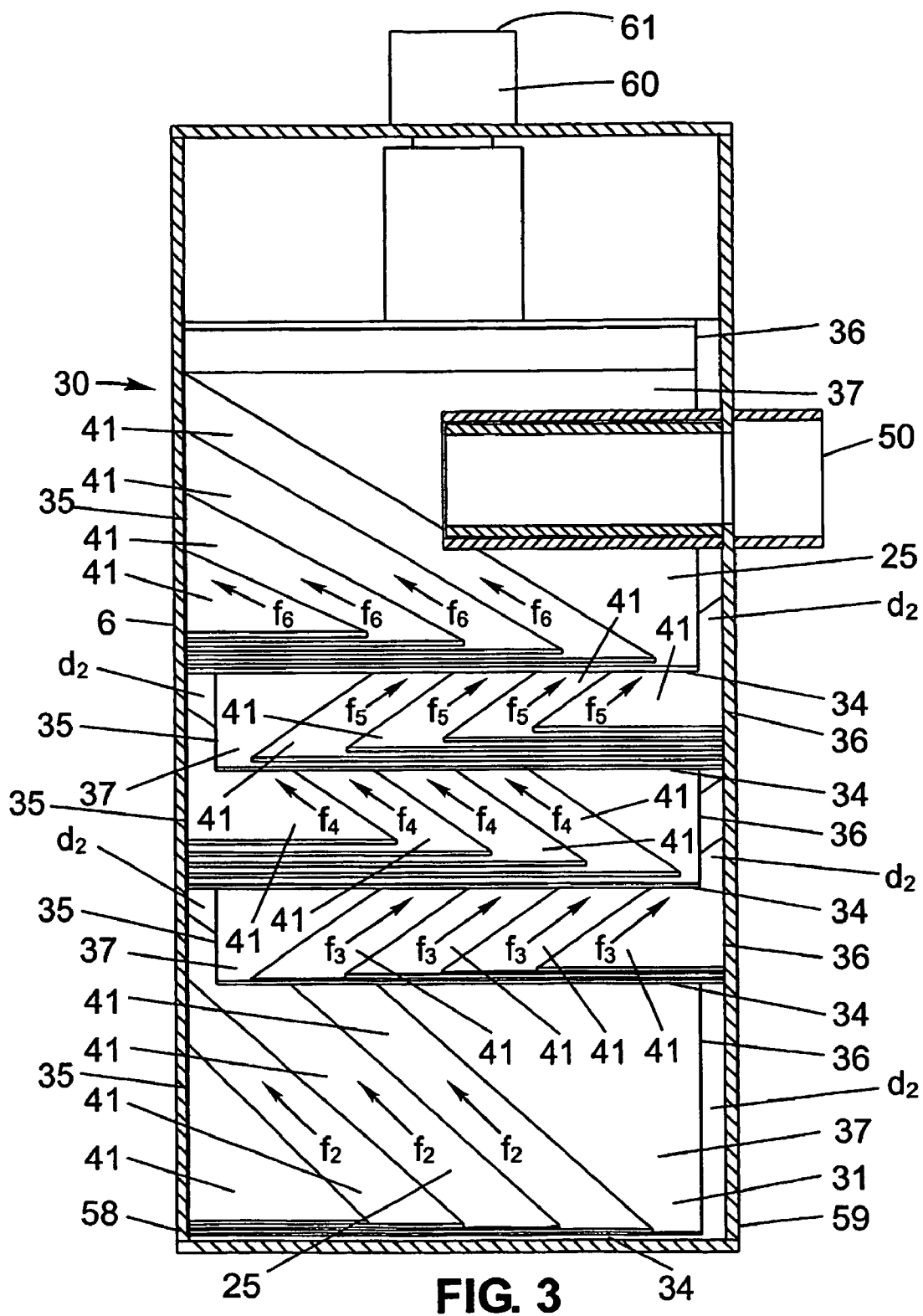
FIG. 3 is a side sectional view of an embodiment of the present invention taken along the lines 3—3 in FIG. 1, depicting the plurality of baffles stacked in an inclined relationship in a plane.
Figure 4:
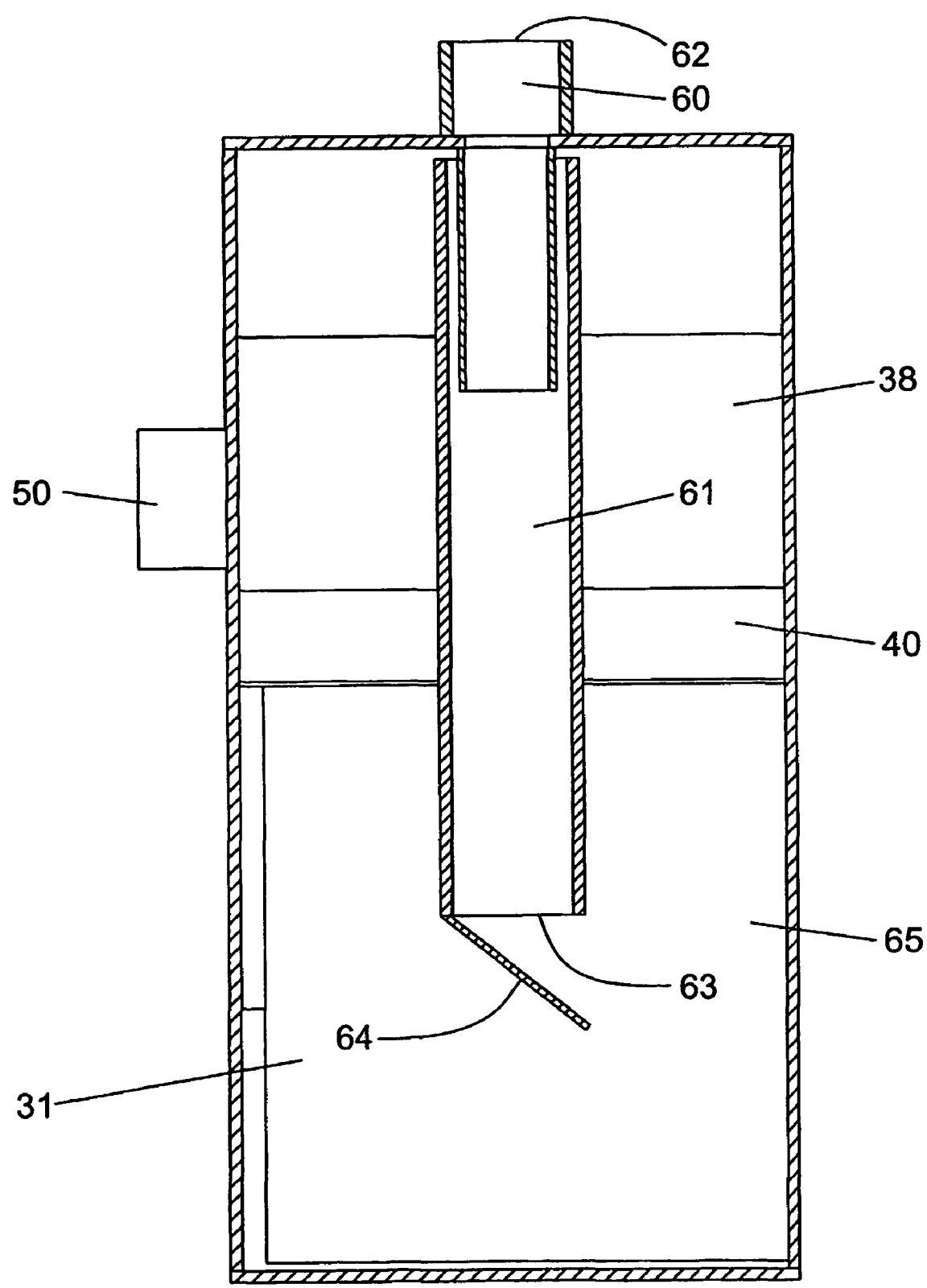
FIG. 4 is a sectional side view of an embodiment of the present invention taken along the lines 4—4 in FIG. 1, depicting the interior of the present invention in a plane.

The inclined relationship of the plurality of stacked baffles 30 creates a flow path $f_1$, as is shown in FIG. 1, between the inlet port 60 and outlet port 50. FIG. 3 depicts the placement of the plurality of the baffles 30 in relation to the side walls 58, 59 of the chamber 53. The plurality of baffles, disclosed in FIG. 1, is comprised of individual fluid separation plates or separation flow plates 25. The separation flow plates 25 provide the surface area over which the flow path $f_1$ passes. In a first plurality of baffles, a first side 35 of each separation flow plate is flush with the first side wall 58 of the chamber 53, while the opposing second side 36 of the separation flow plate or baffle 25 of said plurality of baffles 30 is placed a predetermined distance $d_2$ from the second side wall 59 of the inner chamber 53. The remaining alternating flow plates or baffles 25 in the stacked plurality of baffles 30 are placed so that the second side 36 of the baffles is flush with the second side wall 59 of the chamber 53, and the first side 35 of the baffles is placed a predetermined distance $d_2$ from the first side wall 58 of the chamber 53. The positioning of the separation flow plates in an alternating spaced relationship with the first side wall 58 and a second side wall 59 of the separation chamber 53 creates the flow path $f_1$ through which the composite fluid flows. The fluid separation plates 25 are placed in a stacked fashion in which they extend upwardly and rearwardly from a front wall 56 of the separation chamber 53 to a base baffle 31.

The number of separation flow plates comprising the plurality of baffles 30 in the displayed embodiment is five. However, depending on the efficiency of separation required, the actual number of baffles may vary. The more baffles placed within the separation chamber 53, the more efficient the separation process and longer the flow path $f_1$. In situations where the flow of the composite fluid is not a concern, the number of surface area flow plates 25 created by the plurality of baffles 30 could be substantially increased. Additionally, multiple sets of plurality of baffles 30 could be placed in succession within a larger chamber to provide even additional separation capability.

The separation flow plates 25 creating the plurality of baffles 30 by which flow path $f_1$ passes are formed by the top surfaces 37 of each of said separation flow plates 25 for each one of said plurality of baffles 30. The flow path $f_1$ for each separation flow plate 25 extends across the separation flow plate 25 in an area bounded by the flow plate 25 and the bottom surface 38 of an upper adjacent baffle of said plurality of baffles 30 and the front wall 56 of the inner chamber 53.

Each of said plurality of baffles 30 within said separation chamber are defined by the separation flow plates 25, the separation flow plates 25 being the individual baffle and hence the surface area which the composite fluid passes over. In the embodiment shown in FIG. 1, each of the flow plates 25 is comprised of a single flat top surface 37, wherein the flow path $f_1$ moves over the smooth surface thereof. As can be seen from FIGS. 2 and 3, the separation flow plates 25 may also be comprised of triangular subplates 41 which form sub-flow paths $f_2$, $f_3$, $f_4$, $f_5$ and $f_6$. As can be seen, these multiple flow paths forming composite fluid flow path $f_1$ increase the surface area upon which the material must pass and therefore properly separates the fluid appropriately.

Each of the separation flow plates 25 from the base plate 31 to the top plate 32 in the plurality of baffles 30 is placed at an angle that increases in relation to a vertical axis of the separation chamber housing 52 as the separation flow plates 25 approach an outlet chamber 50. In the disclosed embodiment, the vertical separation between each individual baffle or the separation flow plate 25 and the next upper individual baffle decreases throughout the flow path. The continuing decrease in the vertical separation between individual baffles and corresponding increase of the angle of the individual baffles affects the ability to separate composite fluids and various sized particulate by affecting the velocity that the fluid travels and the amount of turbulence that the composite fluid experiences. As the angle of the separation flow plate 25 forming the plurality of baffles 30 increases relative to the vertical axis, the speed of the fluid in flow paths $f_2$, $f_3$, $f_4$ and $f_5$ increases. The plurality of baffles 30 may be composed of steel, stainless steel, aluminum, a plastic composite or any other similar material.

A support brace 40 for the plurality of baffles 30 extends from the rear wall 57 of the chamber 53 to the bottom surface 38 of the base baffle 31. This support brace 40 is sized so that it extends in the chamber 53 from the rear wall 57 to the bottom surface of base baffle 31. Not only does the support brace 40 serve to assist in supporting the plurality of baffles 30, but it also separates the separation chamber 53 into a sump area 65 and an outlet port 50, by serving as an isolation wall to prevent the composite fluid from reaching the outlet port 50 without traveling the flow path $f_1$ created by the plurality of baffles 30. While in the preferred embodiment the support brace 40 extends from the rear wall 57, the support brace 40 can attach to either of the chamber side walls 58, 59.

Figure 5:
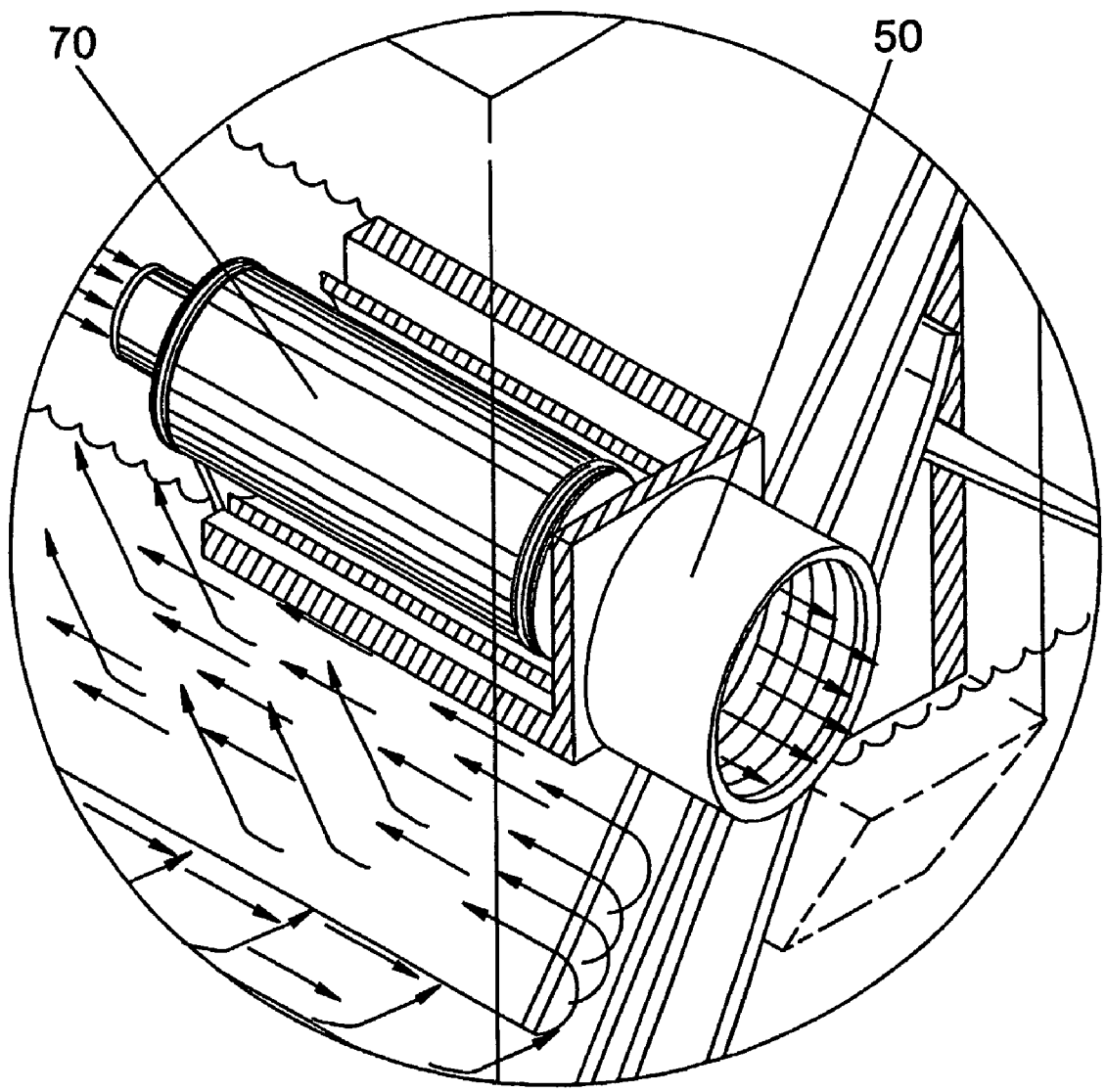
FIG. 5 is a sectional view of the outlet port of the present invention with a filtration device encompassed within the outlet port.

The outlet port 50 is capable of receiving supplemental filtering or coalescing devices 70 that serve to further enhance the separation capacity of the composite fluid separator, as is shown in FIG. 5. Additionally, the outlet port 50 could incorporate a magnetic fluid conditioner to separate the composite fluid.

In other embodiments of the present invention, the distances $d_2$ between the first and second sides 35, 36 of the baffles and the side walls 58, 59 of the chamber 53 and distance $d_1$ the lower end 34 of the baffles and the front wall 56 of the chamber 53 may vary depending upon the circumstances and environment in which the composite fluid separator 51 is being utilized. However, the distances $d_1$ between the lower ends 34 of the plurality of baffles 30 and the front chamber wall 56 must be less than the distance $d_2$ between the first side 35 and second side 36 of the plurality of baffles 30 and the chamber side walls 58, 59. This is necessary to ensure that the fluid moves through the flow path $f_1$, as well as $f_2$, $f_3$, $f_4$, $f_5$ and $f_6$, across each of the separation flow plates 25. As fluid will flow through the path of least resistance, it is important that the opening between the first side and second side 35, 36 of the separation flow plates 25 and the chamber walls 58, 59 provide this path of least resistance.

The inclined, nonparallel positioning of the separation flow plates 25 creates numerous flow paths between the plurality of baffles 30. This flow pathway is the only route through which the composite fluid may flow before accessing the outlet port 50. As the composite fluid follows this flow path created by the plurality of separation flow plates 25, it rises upward in the chamber 53 in a serpentine fashion through the plurality of flow paths mentioned. The flow paths created by the plurality of baffles 30 and hence the individual separation flow plates 25 limit the upward mobility of the fluid with the heavier specific gravity. The molecules of the fluid with the heavier specific gravity come into contact with each other and coagulate into a larger mass until eventually this mass drops into the sump portion 65 of the chamber 53. As the fluid rises in the chamber 53, it continues to lose the heavier fluid and thus the speed with which the fluid travels increases.

In an alternative embodiment of the present invention, as is shown in FIG. 2, each of the separation flow plates 25 may be comprised of a series of subplates 41. In the alternative embodiment, these subplates 41 are a variety of sizes and may be triangular in shape. The subplates 41 are stacked to form a stair-like structure and therefore form the flow paths $f_2$–$f_5$ noted.

The triangular shape of the subplates 41 serves to further direct the composite fluid at an angle up toward the next separation chamber. The series of subplates 41 also provide each of the separation flow plates 25 with an irregular surface and enlarge the contact surface area between the composite fluid and the separation flow plates 25. Increasing the contact surface area with the series of subplates 41 increases the separation of the composite fluid, and the series of subplates 41 also provide a plurality of flow paths across each of the fluid separation plates 25.

Although the preferred embodiment of this invention utilizes subplates 41 in the shape of triangles, the shape of these subplates 41 may vary to include other shapes such as square, rectangle or another shape. The separation flow plates 25 and subplates 41 may also be coated in Teflon or a similar type of material to assist with the separation of particulate from a fluid.

Figure 6:
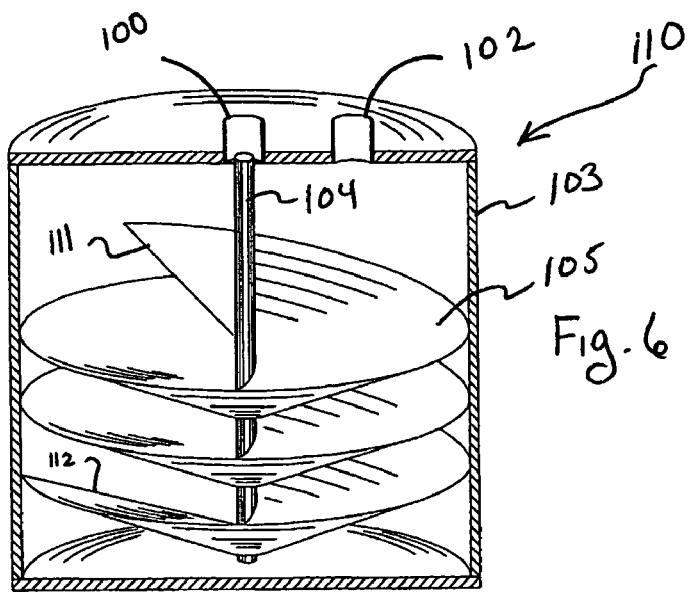
FIG. 6 is a section view of an alternative embodiment of the present invention having a singular spiral separation plate.

As shown in FIG. 6, an alternative embodiment of the fluid separator 110 is depicted. The housing 103 surrounds a singular separation plate which, in this embodiment, is a spiral plate 105. Only a single separation plate is required such that the plurality of flow plates utilized in the prior embodiments is replaced with a single funnel shaped spiral. Alternatively, the spiral may be made up of a plurality of mated spiral plates, each advancing further up the spiral form a lower end to an upper end. An inlet port 100 is provided at the top end of the housing 103 in combination with an outlet port 102. As can be seen therein, the side section view of FIG. 6 details that the inlet port 100 allows the fluid to enter in to the housing 103 and to the bottom portion of the housing through spillway 104. As the fluid enters the housing 103, it rises from the lower end 112 of the spiral plate 105 to the top end 111. As the fluid rises up along the spiral plate 105, the material within the fluid separates such that the heavier material remains at the bottom of the housing 103. Eventually, the fluid, with the heavy particulates or fluid settling out, exits the housing 103 via the outlet port 102. The fluid separator 110 depicted in FIG. 6 provides an alternative embodiment to the plate and subplate configuration depicted herein.

The only way fluid may pass within the internal portion of the housing is up along the spiral plate 105 and the surface formed therein. The connection between the spiral plate 105 and the center spillway 104 and the outer edges which contact the inner side wall of housing 103 are sealed to prevent fluid from passing thereby requiring that the fluid meter slowly up the spiral plate to the outlet port 102. Further spillway deposits the material to the bottom wall of the housing thereby forcing, through pressure or other means, the water upward through the spiral separation plate or plates.

Figure 7:
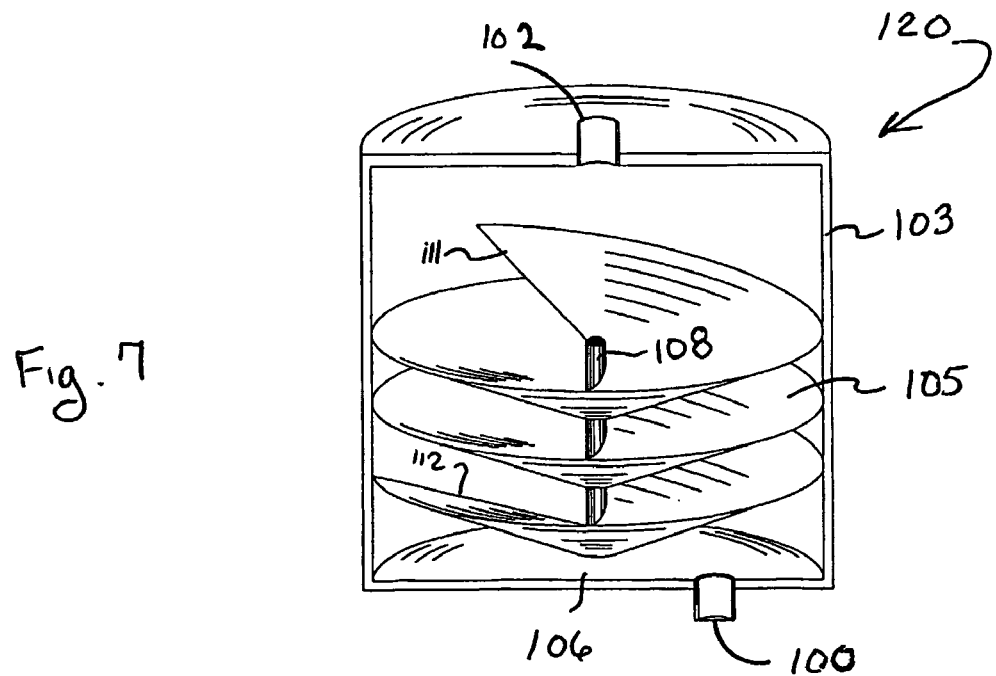
FIG. 7 is a section view of another alternative embodiment of the present invention having a singular spiral separation plate as shown in FIG. 6.

Turning to FIG. 7, an alternative fluid separator 120 is depicted wherein the inlet port 102 is formed in the bottom wall 106 of housing 103 forming a shortened spillway therewith. The spiral plate 105 is positioned within the interior of the housing 103 and again the spiral plate 105 forms a sealing engagement with the inner side wall of the housing 103 and with support 108 thereby preventing fluid to pass. As fluid enters into the inlet port 100 at the bottom wall 106, the fluid is forced up the spiral plate 105 beginning at the lower end 112 and extending up to the top end 111. An outlet port 102 is positioned in the top wall which allows the fluid, once separated from particulates and heavier materials, to exit the fluid separator 120.

The foregoing detailed description is given primarily for clearness of understanding, and no unnecessary limitations are to be understood therefrom, for modifications will become obvious to those skilled in the art upon reading this disclosure and may be made without departing from the spirit of the invention and scope of the appended claims.

I claim:

1. A composite fluid separator, comprising:
   a chamber with a top and bottom surface, a wall surrounding the periphery of said chamber;
   an inlet port in said top surface of said chamber;
   an outlet port on said chamber;
   a spiral plate, said spiral plate having an outer edge in sealing engagement with said wall of said chamber and said spiral plate formed in an upright funnel shape; and
   a center spillway, extending from said inlet port to said bottom surface of said chamber.

2. A composite fluid separator, comprising:
   a separation chamber having an inlet port and an outlet port;
   a spiral plate, said spiral plate having an outer edge in sealing engagement with the wall of said separation chamber and said spiral plate formed in an upright funnel shape; and
   a center spillway extending from said inlet port to the bottom surface of said separation chamber.

3. The composite fluid separator of claim 2 wherein said center spillway extends from said inlet port through the center of said spiral plate.

4. A composite fluid separator, comprising:
   a chamber with a top and bottom surface, a wall forming the periphery of said chamber;
   an inlet port in said bottom surface of said chamber;
   an outlet port on said chamber; and
   a spiral plate positioned internally of said chamber and extending substantially between said top and said bottom surface, said spiral plate having an outer edge in sealing engagement with said wall of said chamber and said spiral plate formed in an upright funnel shape, said separator further having a center support member attached to said bottom surface of said chamber and extending through the center of said spiral plate.

5. The composite fluid separator of claim 4 wherein said outlet port is on said top surface of said chamber.

* * * * *